United States Patent Office 2,744,079
Patented May 1, 1956

2,744,079

ADHESIVE COMPOSITION CONTAINING POLYSILOXANE RUBBER, POLYSILOXANE OIL AND REINFORCING PIGMENT

Frederick L. Kilbourne, Jr., Woodmont, Thomas S. Moroney, Meriden, and Alfred S. Kidwell, Milford, Conn., assignors to The Connecticut Hard Rubber Company, New Haven, Conn., a corporation of Connecticut No Drawing. Application August 9, 1952,
Serial No. 303,618

6 Claims. (Cl. 260—29.1)

This invention relates to a pressure-sensitive adhesive tape and more particularly to a tape comprising a backing of some material such as paper or cloth and an adhesive of novel form applied to one surface of the tape, the adhesive being of such character that the finished tape may be rolled up in a tight roll. The character of the adhesive is also such that it must adhere to the face of the tape to which it is applied but must not adhere so strongly under normal winding pressure to the opposite side of the tape with which it makes contact when wound.

Many of the tapes of this character which are now in use employ adhesives which are composed of hydrocarbon rubbers and resins which tend to oxidize at high temperatures in excess of 300° and to harden when cooled to a temperature of from 0° F. to —40° F. Also the constituents of many of such adhesives are soluble in water and hydrocarbon oils, and for this reason the tapes are not satisfactory in use under conditions of high or low temperature, high humidity, or on wet surfaces or when they are subject to contact by oil.

It is contemplated by the present invention to provide a pressure-sensitive tape having an adhesive which will withstand high and low temperatures and will not be deleteriously affected by hydrocarbon oils or water and hence can be used under a wide variety of conditions. Also the adhesive employed in the present application is such that the tape may be unrolled and applied to any one of a great many different kinds of surfaces and will adhere thereto with strong adhesion when applied by light hand pressure as is desirable in a pressure-sensitive tape. For example, it has been found that the adhesive to be hereinafter described will, when applied under light hand pressure, adhere satisfactorily to surfaces of glass, wood, varnished or painted wood, aluminum, steel, either polished or rusty, paper, natural rubber, butadiene-styrene, neoprene or silicone rubber, and also such plastic materials as polytetrafluoroethylene and polychlorotrifluoroethylene. We have found, therefore, that our pressure-sensitive adhesive tape is not only useful under a variety of conditions of temperature and humidity, but also upon surfaces of a wide variety of material.

One object of the present invention is to provide a pressure-sensitive adhesive tape and a pressure-sensitive adhesive material which will be useful at temperatures as low as —100° F. and as high as 500° F.

Another object of the invention is to provide a pressure-sensitive adhesive which will be applied to a tape or the like and which will be exposed to hydrocarbon oils without loosening its adhesive bonds or without destroying its property of adhering to the surfaces of a wide variety of materials.

A still further object of the invention is to provide a pressure-sensitive adhesive tape having an adhesive applied to one surface thereof, which adhesive will adhere to the surfaces of a wide variety of materials although exposed to water even at temperatures ranging up to the boiling point.

Still another object of the invention is to provide a new and useful pressure-sensitive adhesive material which when applied to a backing strip of material will serve to cause this backing strip to adhere to the surfaces of a wide variety of materials under a wide variety of conditions of humidity and temperature and even when the tape formed by the adhesive and the strip to which it is applied is exposed to hydrocarbon oils.

To these and other ends the invention consists in the novel features and combinations of parts to be hereinafter described and claimed.

The basic constituents from which the present adhesive is made are polysiloxanes which are available in the form of liquids or oils or as rubbers or in the resinous state. These materials have unusual physical and chemical stability with respect to the air or oxygen at high temperatures and do not readily crystallize or freeze at low temperatures. Therefore, their employment in the present composition is conducive to the characteristics desired in the product.

The adhesive is formed by blending a selected polysiloxane oil with a selected silicone rubber and mixing with the blend of these two substances a reinforcing pigment or filler. The oil and rubber should be selected with proper regard to their molecular weights in order to secure the best results and also the proportions in which they are blended and the amount of pigment which is used must be balanced as must also the proper concentration of curing agent and the time and temperature of the cure in order to produce a pressure-sensitive adhesive having the most desirable qualities.

For example, if an oil with too low a molecular weight is selected, it will tend to become volatile at temperatures between 400° and 500° F., which is undesirable. Likewise, if the rubber selected is too low in molecular weight it may produce an adhesive which is too weak or one which will require too large a proportion of the curing agent to strengthen it. This would be objectionable because it would reduce the tackiness of the surface.

Having selected the proper oil and rubber, these two materials are blended together in any convenient manner, such, for example, as by being stirred or by the use of a roller mill or paint mill to secure an intimate mixture, and this composition is further strengthened or reinforced by the addition of pigments or fillers. Here again the selection of the proper ingredient and the proper amount of this ingredient is important. If too large a proportion of excessively finely divided pigment is employed the tackiness of the basic silicone ingredients will be dried up, and the amount and kind of pigment will depend to some extent on the relative proportion of oils and rubbers which have been employed in the basic mixture.

The pigment may be dispersed in the mixture by stirring or by the use of a roller or paint mill, and thereafter a quantity of curing agent such as benzoyl peroxide is likewise incorporated and thoroughly dispersed in the pasty mixture. The amount of curing agent employed must be regulated to give the proper degree of adhesiveness to the final product. If too much is used the adhesive will lose its tacky surface, while on the other hand if too little is employed the adhesive may be excessively tacky and in that event might stick equally to both sides of the tape or strip on which it is deposited.

After the mixture of ingredients is completed, as described above, the composition should be approximately the consistency of honey. It can then be spread upon the surface of the tape or backing materials in any preferred way such as by means of a knife-coating device. The knife may be lowered toward the backing material so that the distance between the latter and the knife is exactly that desired for the thickness of the adhesive.

From the coating knife the coated fabric passes to a heating chamber in which it may be heated for approximately one-half hour at a temperature from 300° to 350° F., the time and the temperature for curing being dependent upon the type of curing agent and the proportions of the various ingredients in the composition.

After being cured in this manner the tape which consists of the backing material with the adhesive applied thereto may be then rolled into rolls of the desired length and cut into tapes or strips of the desired width. The tape is then used in the ordinary manner of pressure-sensitive tapes by being merely unrolled from the supply roll and pressed against the surface to which it is desired that it adhere. The tape may be employed for many different purposes as are pressure-sensitive tapes at the present time. It will, however, be particularly useful where it is exposed to conditions of temperatures either very low or very high, and also where it is subject to conditions of service where other materials are unstable or inapplicable. While temperatures as low as −100° F. or as high as 500° F. have been mentioned as temperatures which would not affect the usefulness of the adhesive, it will be understood that these temperatures are not the lower and upper limits of temperature between which the material will be useful. It has been found that the adhesive will not lose its adhesive qualities even though exposed to lower and higher temperatures than those named.

In a preferred embodiment of our invention we have employed a rubber or gum which is a dimethyl silicone polymer such as General Electric S. E. 76, the polymerization having been brought about with an alkaline catalyst such as sodium hydroxide although we do not wish to be limited to this material alone. The oil employed is a dimethyl silicone oil having a specific gravity of approximately 0.9693 at 20° C. and a viscosity of approximately 1000 centistokes at 100° F., such an oil being obtainable as General Electric SF-96(1000). To these constituents we add small amounts of titanium dioxide and a silica aerogel pigment as reinforcing agents and a suitable quantity of benzoyl peroxide for a curing agent.

The exact proportions of the above ingredients can be varied over a considerable range provided a proper balance is adhered to so that the tape will not be too dry or non-tacky and will adhere to the backing strip. We have found, for example, that less than two parts of the rubber gum to eight parts of the oil results in an adhesive which is weak while the use of equal parts of rubber and oil produces an adhesive which is too dry. The amount of the pigment or reinforcing agent may vary between 1 and 3 parts of pigment to 10 parts of the rubber oil mixture, while the amount of benzoyl peroxide curing agent may vary from .2 part to .25 part per 10 parts of the rubber oil mixture.

One example of a preferred composition is as follows:

4 parts of the dimethyl silicone polymer gum such as General Electric SE76,
6 parts of a dimethyl silicone oil having a specific gravity of .9693 at 20° C. and a viscosity of 100 centistokes at 100° F.,
1.5 parts of titanium dioxide,
.2 part of silica aerogel pigment, and
.2 part of benzoyl peroxide.

The above ingredients should be thoroughly mixed as explained above, the mixture spread to a depth of approximately .005 inch on a backing material such as glass tape, and then cured in an oven at 350° F. for 30 minutes. A tape resulting from this process was then tested in many ways and found to be quite satisfactory. For example, it was found to adhere well to such surfaces as glass, porcelain, tile, painted wood, aluminum, bronze, silicone and other synthetic rubbers. Also samples of this tape were wrapped around aluminum mandrels and exposed to temperatures as low as −100° F. as well as immersed in boiling water. In all cases the adhesive still continued to adhere to the glass backing tightly and adhere in some degree to the aluminum mandrel.

In the example above given all the curing agent was utilized in the cure so that there was no residual capacity in the completed tape for further cure or vulcanization. Therefore, the adhesive properties present in the completed tape are exceedingly permanent and are not changed by subjection of the tape to high or low temperatures. If, however, it is desired to produce an adhesive tape which will vulcanize after it has been applied, this may readily be accomplished. It is only necessary to pass the completed tape, after curing, quickly through a dilute solution of benzoyl peroxide in a low boiling solvent thereby adding a small proportion of the benzoyl peroxide to the composition when the low boiling solvent is removed by evaporation. Such a tape would not be stable at temperatures in excess of 150° F. but would be stable at lower temperatures. However, by the incorporation of the extra benzoyl peroxide the tape may now be used to wrap an article or to adhere to a surface, and, when heated to a temperature of 200° F. or more, the adhesive which was originally plastic and sticky will become non-plastic or rubbery and the bond will be stronger than in the uncured state.

It may also be noted that a composition which is a little too sticky can be brought to the desired degree of tackiness by using a larger proportion of the pigment or a larger proportion of the curing agent. On the other hand, and adhesive composition which is basically too viscous and thereby too dry can be brought to the desired consistency by using less pigment and less curing agent. The consistency of the composition may, therefore, be varied by varying the pigment and curing agent as well as by varying the proportional parts of oil and rubber which are employed.

It will be obvious to those skilled in the art that many possible variations of the composition described herein may be made without departing from the spirit of the invention; also, the adhesive may be deposited on tapes and fabrics other than glass such as cotton, polyethylene, rubber, paper, polytetrafluoroethylene, chlorotrifluoroethylene, nylon and many other possible backing materials which it is desired to stick to other surfaces. It is also within the spirit of this invention that other silicone rubbers, in place of the one described, may be used. The only stipulation regarding such rubbers is that they should dissolve in or mix with the chosen silicone oils. Similarly, other silicone oils may be used without departing from the spirit of the invention. These silicone oils should be stabilized with respect to heat; that is, they should not polymerize by simply heating. These characteristics are those of oils containing no reactive end groups or other active centers of polymerization.

The ingredients selected in the examples shown herein were chosen only as examples and any of the well-known fillers for silicone rubber, such as diatomaceous earth, zinc oxide, aluminum oxide, silica, lithopone, calcium carbonate and carbon black may be used. Benzoyl peroxide is not the only curing ingredient that may be used. Among others that might be listed, tertiary butyl perbenzoate, is applicable.

What we claim is:

1. A pressure-sensitive adhesive material consisting of a mixture of 8 to 5 parts of a heat-stable polydimethylsiloxane oil, from 2 to less than 5 parts of an unvulcanized polydimethylsiloxane rubber which is soluble in the silicone oil, from 1 to 3 parts of reinforcing pigment per 10 parts of rubber-oil mixture selected from the group consisting of silicon dioxide, titanium dioxide, aluminum oxide, zinc oxide, diatomaceous earth, calcium carbonate and carbon black, and from 0.2 to 0.25 part of a curing agent per 10 parts of rubber-oil mixture selected from the group consisting of benzoyl peroxide and tertiary butyl perbenzoate.

2. A pressure-sensitive adhesive material consisting of a mixture of 8 to 5 parts of a heat-stable polydimethylsiloxane oil, from 2 to less than 5 parts of an unvulcanized polydimethylsiloxane rubber which is soluble in the silicone oil, from 1 to 3 parts of reinforcing pigment per 10 parts of rubber-oil mixture selected from the group consisting of silicon dioxide, titanium dioxide, aluminum oxide, zinc oxide, diatomaceous earth, calcium carbonate and carbon black, and from 0.2 to 0.25 part of a curing agent per 10 parts of rubber-oil mixture selected from the group consisting of benzoyl peroxide and tertiary butyl perbenzoate, and said mixture being cured to a permanently tacky state by heating from 10 to 60 minutes at a temperature of 250° to 400° F.

3. A pressure-sensitive adhesive material as set forth in claim 1 wherein the reinforcing pigment is titanium dioxide and curing agent is benzoyl peroxide.

4. A pressure-sensitive adhesive material as set forth in claim 1 wherein the reinforcing pigment is silica aerogel, and the curing agent is benzoyl peroxide.

5. A pressure-sensitive adhesive material as set forth in claim 2 wherein the curing agent is benzoyl peroxide.

6. A pressure-sensitive adhesive material as set forth in claim 2 wherein the curing agent is tertiary butylperbenzoate.

References Cited in the file of this patent
UNITED STATES PATENTS

| | | |
|---|---|---|
| 2,502,286 | Sowa | Mar. 28, 1950 |
| 2,558,393 | Kauppi | Mar. 11, 1952 |
| 2,610,167 | Te Grotenhuis | Sept. 9, 1952 |